US007968056B2

(12) United States Patent
Stockwell

(10) Patent No.: US 7,968,056 B2
(45) Date of Patent: Jun. 28, 2011

(54) METHOD AND APPARATUS FOR TRANSFERRING PIPETTE TIPS

(76) Inventor: Joe Stockwell, Scottsdale, AZ (US)

( * ) Notice: Subject to any disclaimer, the term of this patent is extended or adjusted under 35 U.S.C. 154(b) by 902 days.

(21) Appl. No.: 10/709,497

(22) Filed: May 10, 2004

(65) Prior Publication Data

US 2005/0249638 A1 Nov. 10, 2005

(51) Int. Cl.
*B01L 9/00* (2006.01)
*G01N 35/10* (2006.01)

(52) U.S. Cl. ........... 422/104; 422/99; 422/100; 436/180

(58) Field of Classification Search ........................ None
See application file for complete search history.

(56) References Cited

U.S. PATENT DOCUMENTS

| | | | | |
|---|---|---|---|---|
| 5,061,449 A | | 10/1991 | Torti et al. | |
| 5,232,669 A | | 8/1993 | Pardinas | |
| 5,324,482 A | * | 6/1994 | Scaramella et al. | 422/100 |
| 5,497,670 A | | 3/1996 | Carl | |
| 5,507,193 A | | 4/1996 | Ishihara | |
| 5,588,792 A | * | 12/1996 | Tiso | 414/404 |
| 5,736,105 A | | 4/1998 | Astle | |
| 5,882,603 A | * | 3/1999 | Taggart | 422/104 |
| 6,182,719 B1 | * | 2/2001 | Yahiro | 141/130 |
| 6,622,578 B2 | | 9/2003 | Carl | |
| 7,060,226 B1 | * | 6/2006 | Jessop et al. | 422/100 |
| 2003/0129089 A1 | * | 7/2003 | Arnold et al. | 422/63 |
| 2003/0190263 A1 | * | 10/2003 | Yiu | 422/100 |

* cited by examiner

*Primary Examiner* — P. Kathryn Wright

(74) *Attorney, Agent, or Firm* — Zeman-Mullen & Ford, LLP

(57) ABSTRACT

A method and apparatus for transferring pipette tips is presented which includes first and second members that are assembled and interlocked with one another to move the apparatus into locked and unlocked positions. The first member includes plugs for retaining the large diameter end of pipette tips and the second member includes small projections capable of contacting an outer surface of the pipette tips while they are positioned on the plugs of the first member to lock the pipette tips in place for transfer.

9 Claims, 12 Drawing Sheets

METHOD AND APPARATUS FOR TRANSFERRING PIPETTE TIPS

FIELD OF INVENTION

This invention relates, generally, to a method and apparatus for transferring pipette tips and, in particular, to an apparatus for efficiently transferring pipette tips that includes two members assembled and interlocked with one another that can be positioned with respect to one another to hold pipette tips onto, and release pipette tips from, the apparatus.

BACKGROUND OF INVENTION

Prior art apparatus for dispensing controlled amounts of liquid into receptacles which include means for loading and stripping pipette tips from the apparatus have been known for some time. For example, U.S. Pat. No. 5,497,670 discloses an apparatus for dispensing controlled amounts of liquid that includes means for loading disposable pipette tips onto fluid loading/dispensing cylinders and maintaining a positive pressure load on the tips during introduction of the liquid into the pipette tips and dispensing of the fluid. The positive pressure provides a liquid seal between the pipette tips and the cylinders during operation of the apparatus. The pressure is then released to break the seal and remove the pipette tips from the apparatus.

U.S. Pat. No. 6,622,578 B2 discloses an apparatus for aspirating and dispensing controlled amounts of liquid from a solid dispense block which includes means for loading pipette tips designed for sealing on its outside means into internal cylinders contained within the dispense block. The dispense block includes a solid block of material having a plurality of internal cylinders to engage and seal the pipette tips. The pipette tips are modified from their conventional design to include a disc-shaped ring portion adjacent to one end of the pipette tip.

Although these prior art apparatus could be used to transfer pipette tips from one location to another without using the pipette tips for dispensing controlled amounts of liquid, such as when transferring new pipette tips from a new pipette tip storage box to an empty tray carrier, these apparatus would be overly cumbersome and inefficient to use. Accordingly, there is a need for a simple, portable, cost-effective apparatus that can transfer pipette tips from one location to another, and that can transfer pipette tips from one location to another while maintaining them in a predetermined alignment configuration.

SUMMARY OF INVENTION

In general, the present invention provides an efficient and cost effective method and apparatus for transferring pipette tips from one location to another while maintaining them in a predetermined alignment and configuration. The apparatus includes two interlocked members with one member, the transfer plate, having a plurality of protrusions or plug members for seating pipette tips at their larger diameter ends and the other member, the frame, having a plurality of smaller projections or protuberances capable of contacting the outer surface of the pipette tips while they are positioned on the protrusions or plug members. The plug members and smaller projections or protuberances may comprise a variety of sizes and shapes to accommodate the various sizes and shapes of pipette tips.

In accordance with one embodiment of the invention, the plug members may be arranged in parallel rows on the transfer plate with the parallel rows of plug members being separated by elongated slots contained within the transfer plate. The frame may include elongated slots that are cut through the entire depth of the frame to create pass through openings that are separated by elongated rails, which comprise part of the frame itself. When the transfer plate and the frame are assembled and interlocked with one another, the elongated rails contained within the frame fit within the elongated slots contained in the transfer plate.

Once the transfer plate and the frame are assembled and interlocked with one another, they are slid with respect to one another such that the small projections or protuberances on the rails of the frame are positioned between the plug members of the transfer plate thereby presenting the pipette tip transfer apparatus of the present invention in a released position. The plug members of the transfer plate are then positioned over the larger diameter end of the pipette tips in the bulk patterned storage and the frame is slid in one direction with respect to the transfer plate so that the small projections or protuberances of the frame come into contact with an outer surface of the pipette tips that are positioned on the plug members of the transfer plate. This movement functions to retain the pipette tips in place on the plug members and presents the pipette tip transfer apparatus of the present invention in a retained position. The pipette tips can then be moved from one location to another, such as from bulk patterned storage to an empty pipette tip tray having a standard hole pattern, while retained onto the pipette tip transfer apparatus.

Once the pipette tips are transferred to a desired location, such as into an empty pipette tray, they can be released from the pipette tip transfer apparatus of the present invention by sliding the frame in relation to the transfer plate so that the small projections or protuberances of the frame no longer contact an outer surface of the pipette tips. The pipette tips will then fall away from the plug members of the transfer plate and fall into place at the desired location, such as the empty pipette tip tray.

In accordance with one aspect of the present invention, the transfer plate and the frame are comprised of a moldable plastic and the plug members of the transfer plate may be hollow.

In accordance with a further aspect of the present invention, the transfer plate may further comprise one or more tab members for assisting in sliding the frame relative to the transfer plate when the two members are assembled and interlocked with one another.

The transfer plate and the frame of the pipette tip transfer apparatus of the present invention are completely removable from one another, which enhances cost effectiveness in manufacturing them, and may comprise any suitable shape or form which allows them to be assembled and interlocked with one another.

BRIEF DESCRIPTION OF DRAWINGS

The present invention will hereinafter be described in conjunction with the appended drawing figures, wherein like numerals denote like elements, and.

DETAILED DESCRIPTION

The present invention is directed to a method and apparatus for transferring pipette tips. The pipette tip transfer apparatus 10 of the present invention generally includes a first member 12 and a second member 14, such as the transfer plate and the frame, that are assembled and interlocked with one another and moveable with respect to one another (See FIGS. 3 and 4), to enable pipette tips to be retained on the transfer plate in a retained position so that the pipette tips can be moved from one location to another.

Figure 1:
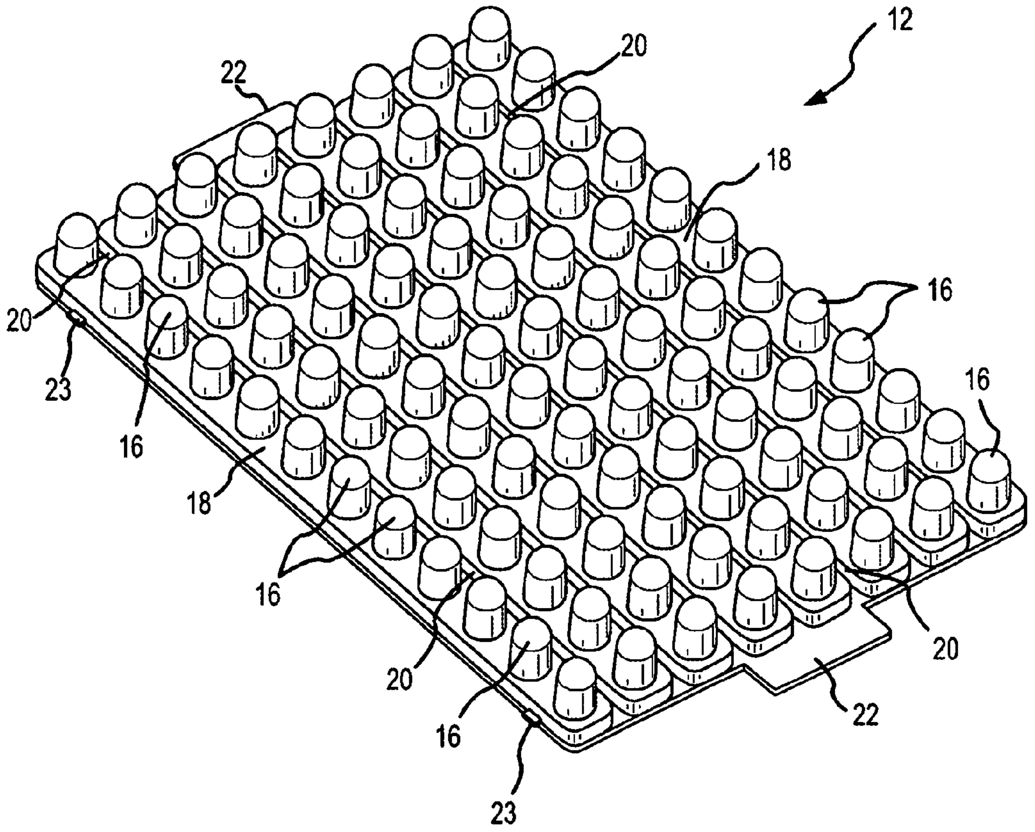
FIG. 1 is a perspective view of the transfer plate of the pipette tip transfer apparatus of the present invention.

FIG. 1 illustrates a perspective view of transfer plate 12 of the pipette tip transfer apparatus of the present invention. Transfer plate 12 comprises a generally rectangular shape but it should be appreciated by those skilled in the art that transfer plate 12 may comprise any suitable shape or form that is capable of being assembled and interlocked with a frame. Transfer plate 12 includes a plurality of plug members 16 which extend from a bottom surface 18 of transfer plate 12. In FIG. 1, plug members 16 are shown arranged in parallel rows and separated by slots 20 contained in transfer plate 12. It should be noted that plug members 16 and slots 20 may be arranged in any configuration or manner as long as transfer plate 12 is capable of being assembled and interlocked with a frame that allows for retaining pipette tips in place on plug members 16.

Transfer plate 12 may also comprise one or more tab members 22 positioned somewhere about its outer circumference to assist in sliding frame 14 relative to transfer plate 12 when the transfer plate and the frame are assembled and interlocked with one another. Transfer plate 12 may also include one or more small extrusions 23 extending from its outer circumference, which are configured to fit within openings contained in a frame to aid in aligning and securing the transfer plate and the frame when assembled and interlocked with one another. To enhance cost savings and ease in manufacture, plug members 16 may be hollow.

Figure 2:
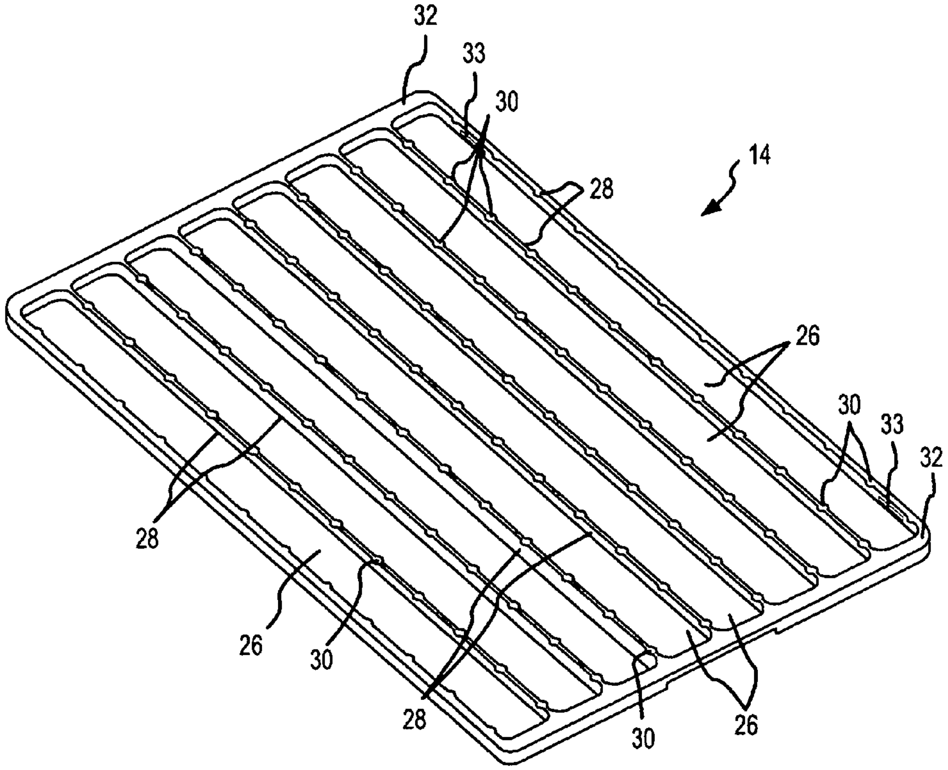
FIG. 2 is a perspective view of the frame of the pipette tip transfer apparatus of the present invention.

Turning now to FIG. 2, a perspective view of the frame 14 of the pipette tip transfer apparatus of the present invention is shown. Like transfer plate 12 shown in FIG. 1, frame 14 comprises a generally rectangular shape but could comprise any suitable shape or form that is capable of being assembled and interlocked with the transfer plate. Frame 14 includes a plurality of elongated slots 26 formed therethrough that are separated by elongated rails 28 which comprise part of frame 14. Elongated rails 28 further include a plurality of small projections or protuberances 30 which extend into elongated slots 26 from a bottom surface 32 of frame 14.

In FIG. 2, elongated slots 26 are shown arranged in parallel and separated by elongated rails 28, with small projections or protuberances 30 spaced equidistantly along the length of elongated rails 28. Elongated slots 16, elongated rails 28, and small projections 30 may be arranged in any manner or configuration as long as frame 14 is capable of being assembled and interlocked with transfer plate 12 so that elongated rails 28 of frame 14 fit within elongated slots 20 of transfer plate 12 and small projections 30 of frame 14 are capable of being aligned with plug members 16 of transfer plate 12 thereby enabling pipette tips to be retained into place on plug members 16.

Frame 14 may also include one or more slits 33 located in its outer circumference for receiving small extrusions 23 of transfer plate 12 to aid in aligning and securing the transfer plate and the frame when assembled and interlocked with one another. Transfer plate and the frame 12 and 14 are preferably comprised of a moldable, rigid plastic but may be comprised of any material that enables transfer plate and the frame to assemble and interlock with one another and easily retain and release pipette tips from plug members 16 of transfer plate 12.

Figure 3:
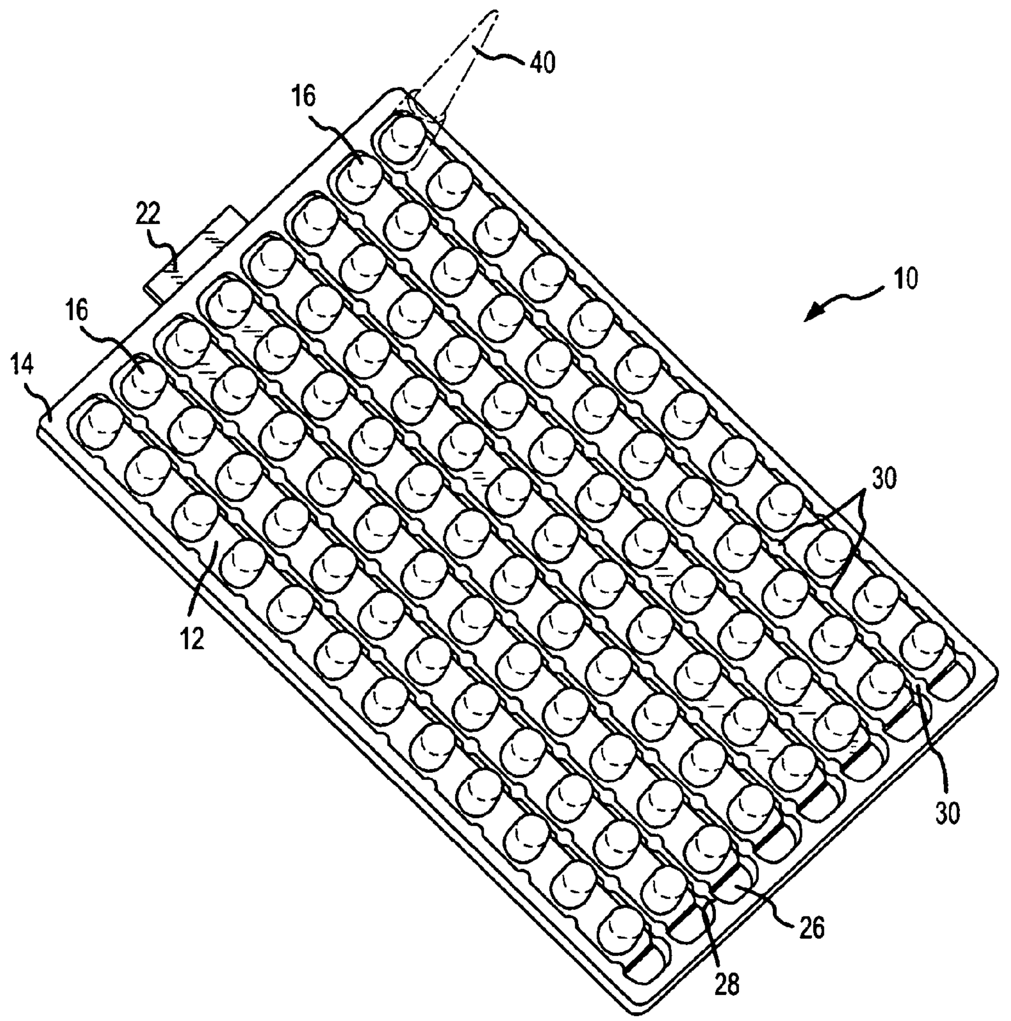
FIG. 3 is a bottom perspective view of the pipette tip transfer apparatus of the present invention where the transfer plate and the frame are assembled and interlocked with one another in a released position.
Figure 4:
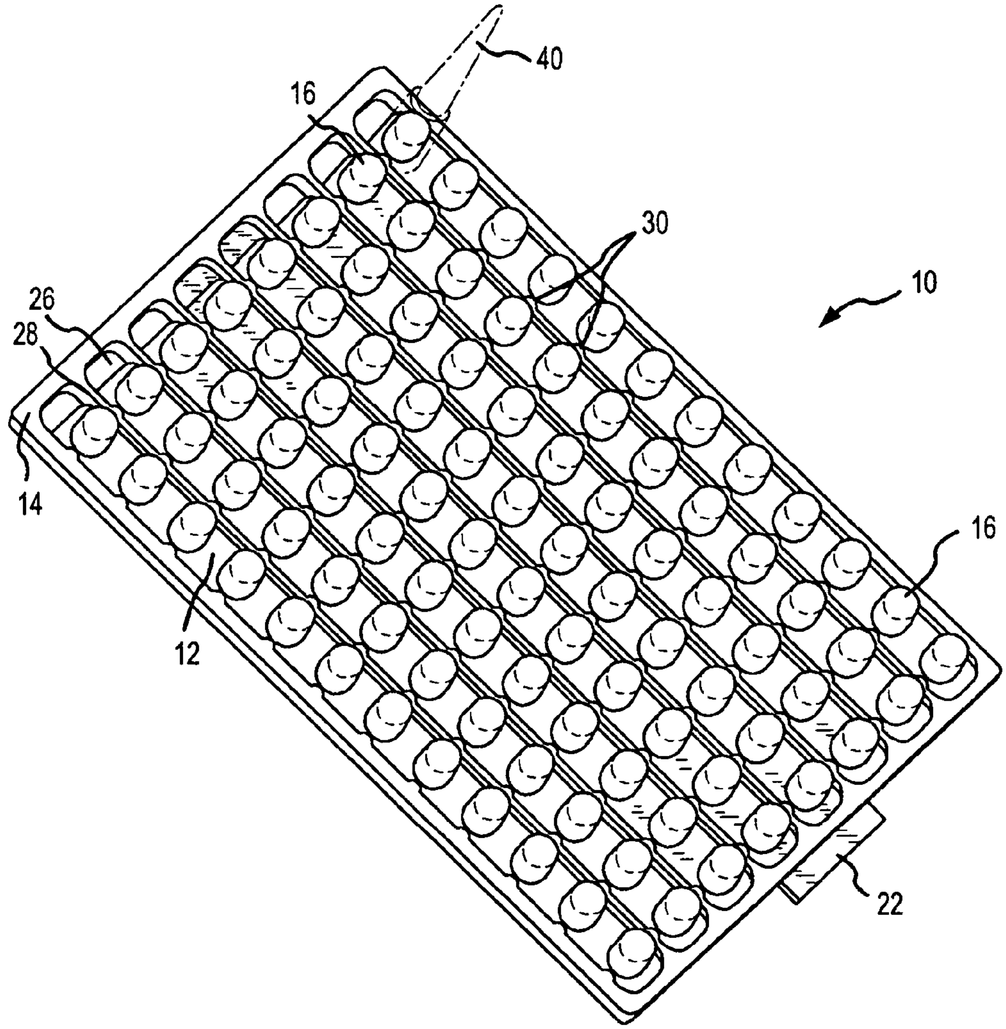
FIG. 4 is a bottom perspective view of the pipette tip transfer apparatus of the present invention where the transfer plate and the frame are assembled and interlocked with one another in a retained position.

A bottom perspective view of the pipette tip transfer apparatus 10 of the present invention showing the transfer plate and the frame 12 and 14 assembled and interlocked with one another in a released position is shown in FIG. 3. A pipette tip 40 is also shown engaged with a plug member 16 of transfer plate 12. In order to transfer multiple pipette tips, frame 14 is slid relative to transfer plate 12 so that small projections 30 of frame 14 are positioned between plug members 16 of transfer plate 12 (as shown in FIG. 3) to present the pipette tip transfer apparatus in a released position. A bottom surface of pipette tip transfer apparatus 10 is then lowered on top of the larger diameter end of the pipette tips so that plug members 16 of transfer plate 12 are positioned within the larger diameter ends of the pipette tips.

After plug members 16 are positioned in the larger diameter ends of the pipette tips to be transferred, frame 14 is slid relative to transfer plate 12 so that small projections 30 of frame 14 come into contact with the outer surfaces of the pipette tips that are positioned over plug members 16 of transfer plate 12. Small projections 30 function to securely hold the pipette tips onto plug members 16 thereby retaining the pipette tips into place so that they can be moved or transferred to another location by simply sliding the entire pipette tip transfer apparatus.

Figure 12:
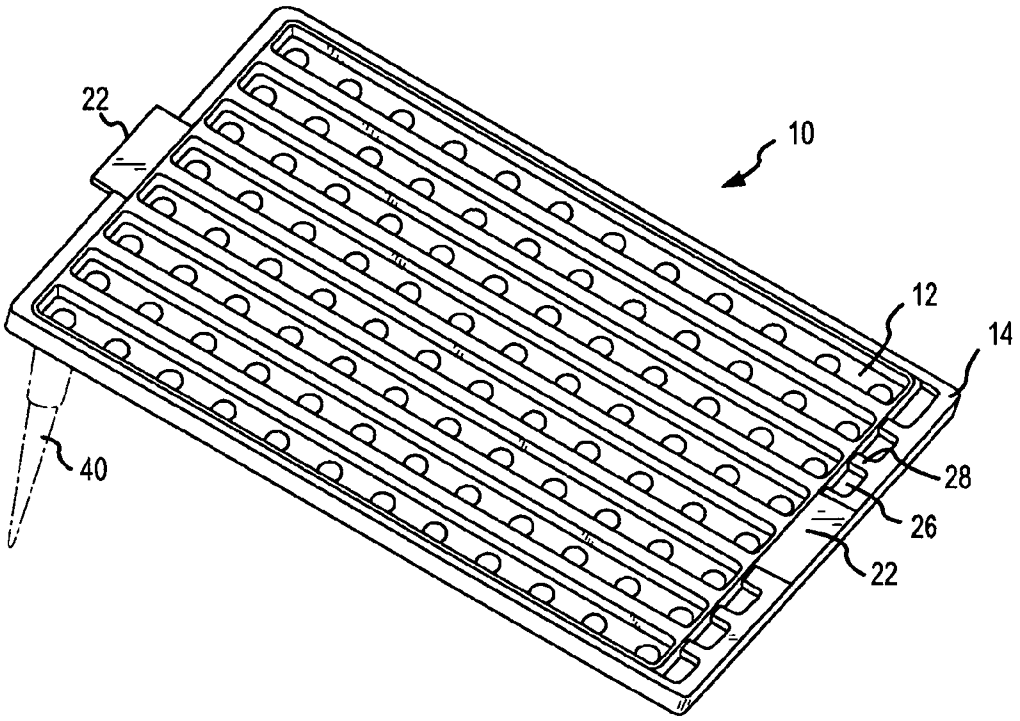
FIG. 12 is a top perspective view of the pipette tip transfer apparatus of the present invention where the transfer plate and the frame are assembled and interlocked with one another in a retained position.

FIG. 12 shows a top perspective view of the pipette tip transfer apparatus of the present invention where the transfer plate and the frame are assembled and interlocked with one another in a locked position. Tab members 22 of transfer plate 12 are used to aid in sliding frame 14 relative to transfer plate 12 to move the pipette tip transfer apparatus of the present invention into retained and released positions with respect to the pipette tips.

Once the pipette tips are transferred to their desired location, the pipette tips are released from the pipette tip transfer apparatus 10 of the present invention by sliding the apparatus into a released position; this is done by sliding frame 14 relative to transfer plate 12 so that small projections 30 of frame 14 are positioned between plug members 16 of transfer plate 12. The pipette tips will then drop off of plug members 16 and into place at their new location.

Figure 5:
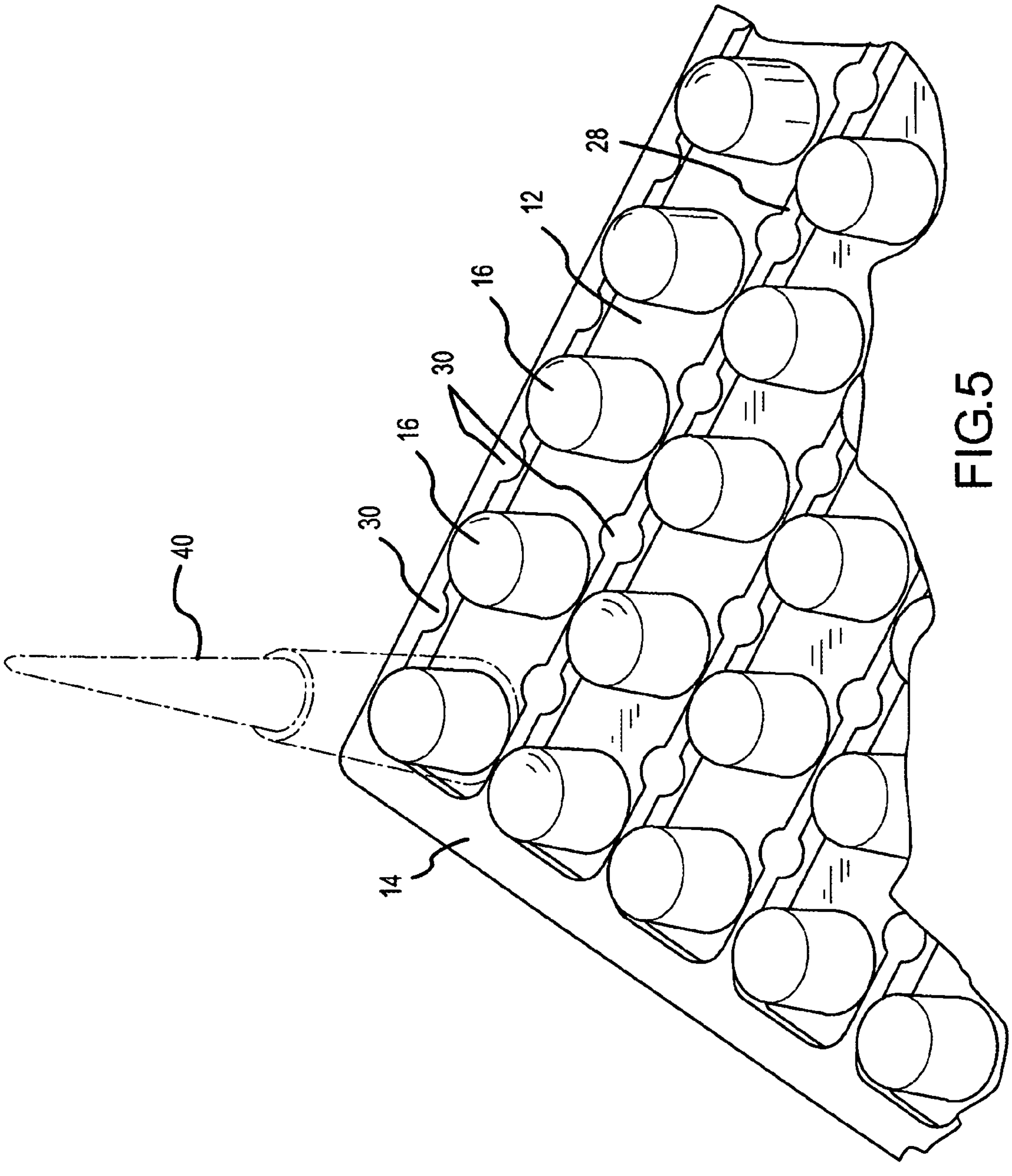
FIG. 5 is a magnified bottom perspective view of a portion of the transfer plate and the frame of the pipette tip transfer apparatus of the present invention shown assembled and interlocked with one another in a released position with a pipette tip shown positioned over a plug of the transfer plate.

FIG. 5 is a magnified bottom perspective view of a portion of FIG. 3 showing the transfer plate and the frame of the pipette tip transfer apparatus of the present invention in assembled and interlocked with one another in a released position with a pipette tip shown positioned over a plug of the transfer plate. As can be easily seen in FIG. 5, small projections 30 of frame 14 are positioned between plug members 16 of transfer plate 12 when pipette tip transfer apparatus 10 is in a released position. In the released position, small projections 30 of frame 14 do not come into contact with any portion or surface of the pipette tips 40.

Figure 6:
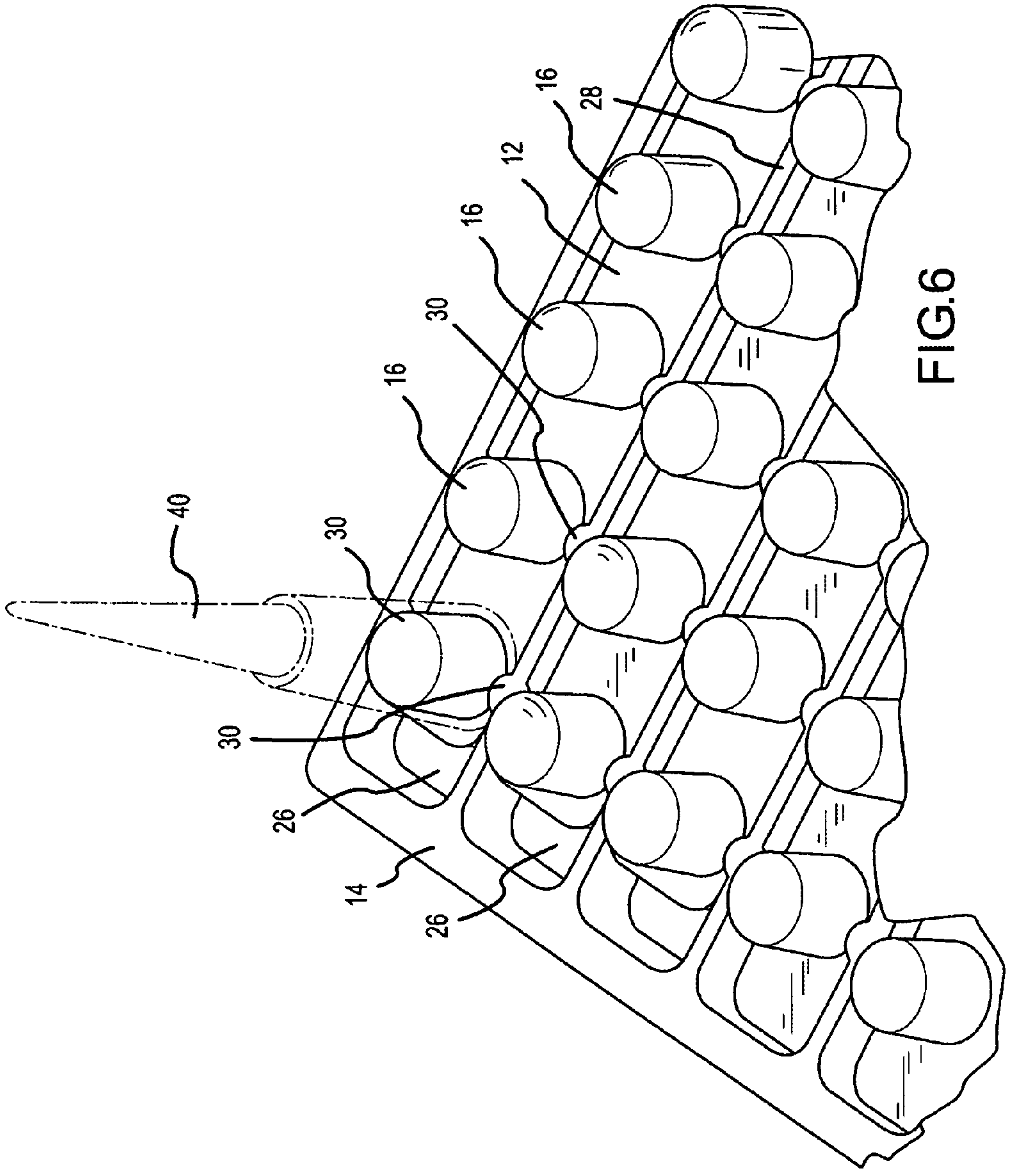
FIG. 6 is a magnified bottom perspective view of a portion of the transfer plate and the frame of the pipette tip transfer apparatus of the present invention shown assembled and interlocked with one another in a retained position with a pipette tip shown positioned over a plug of the transfer plate and retained in place by the frame.

A magnified bottom perspective view of a portion of the transfer plate and the frame of the pipette tip transfer apparatus of the present invention shown assembled and interlocked with one another in a retained position with a pipette tip shown positioned over a plug of the transfer plate and retained in place is shown in FIG. 6. As can be easily seen in FIG. 6, in order to move the pipette tip transfer apparatus 10 into a retained position, frame 14 is slid in relation to transfer plate 12 so that small projections 30 of frame 14 contact an outer surface of pipette tip 40 thereby securely retaining pipette tip 40 on plug member 16 by holding pipette tip 40 firmly against plug member 16.

As shown in FIG. 6, one embodiment of small projections 30 comprise semi-circle or half disc shaped projections, which extend from elongated rails 28 of a bottom surface of frame 14. In the exemplary embodiment of the pipette tip transfer apparatus 10 shown in FIGS. 6 and 7, two small projections 30 of frame 14 are associated with each plug member 16 of transfer plate 12.

Figure 7:
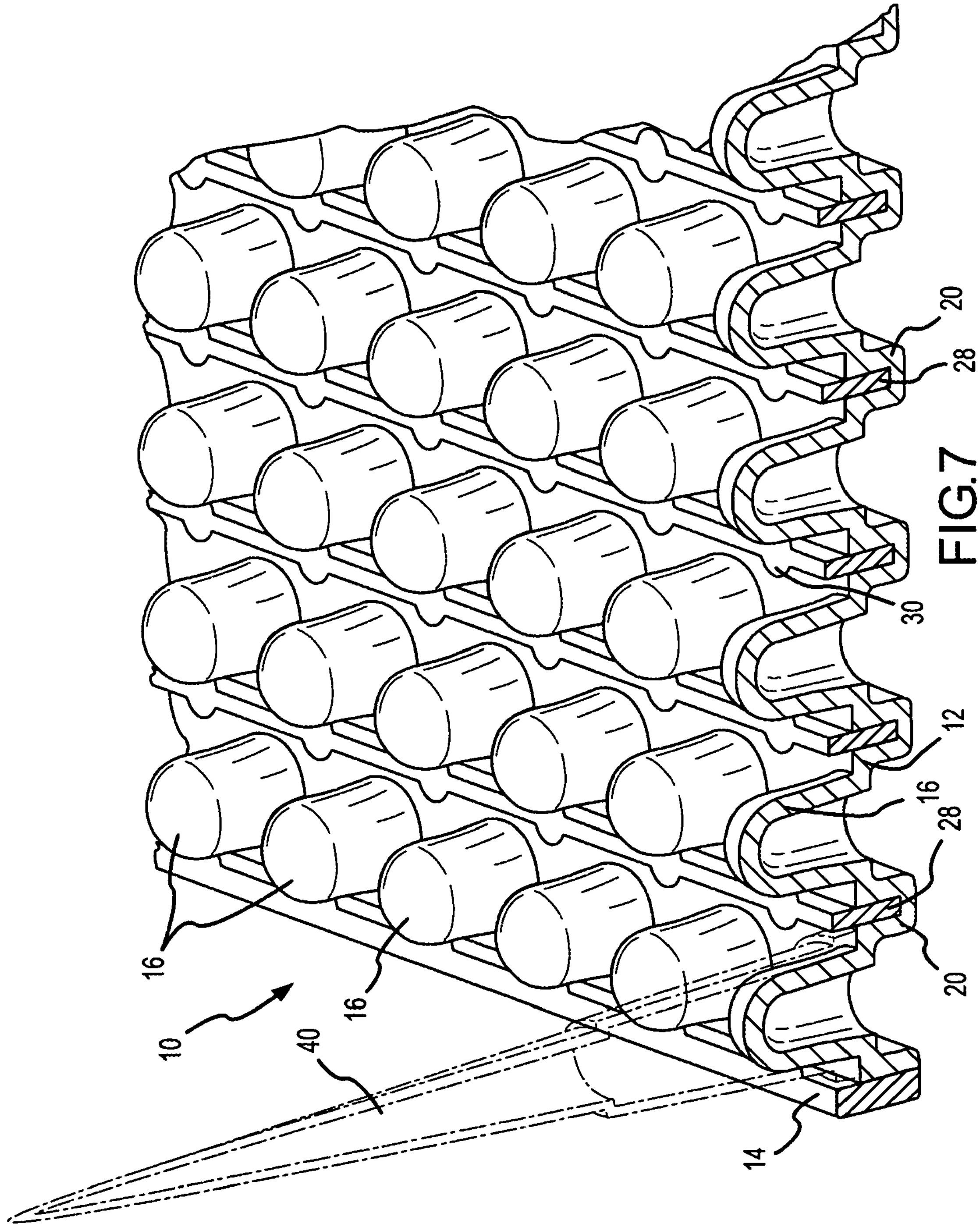
FIG. 7 is a partial cross-sectional view of the transfer plate and the frame of the pipette tip transfer apparatus of the present invention shown assembled and interlocked with one another in a released position.

FIG. 7 shows a partial cross-sectional view of the transfer plate and the frame 12 and 14 of pipette tip transfer apparatus 10 of the present invention shown assembled and interlocked with one another in a released position. In the released position, small projections 30 of frame 14 are positioned between plug members 16 of transfer plate 12. Also, as can clearly be seen in FIG. 7, when transfer plate and the frame 12 and 14 are assembled and interlocked with one another, elongated rails 28 of frame 14 fit within elongated slots 20 of transfer plate 12.

Figure 8:
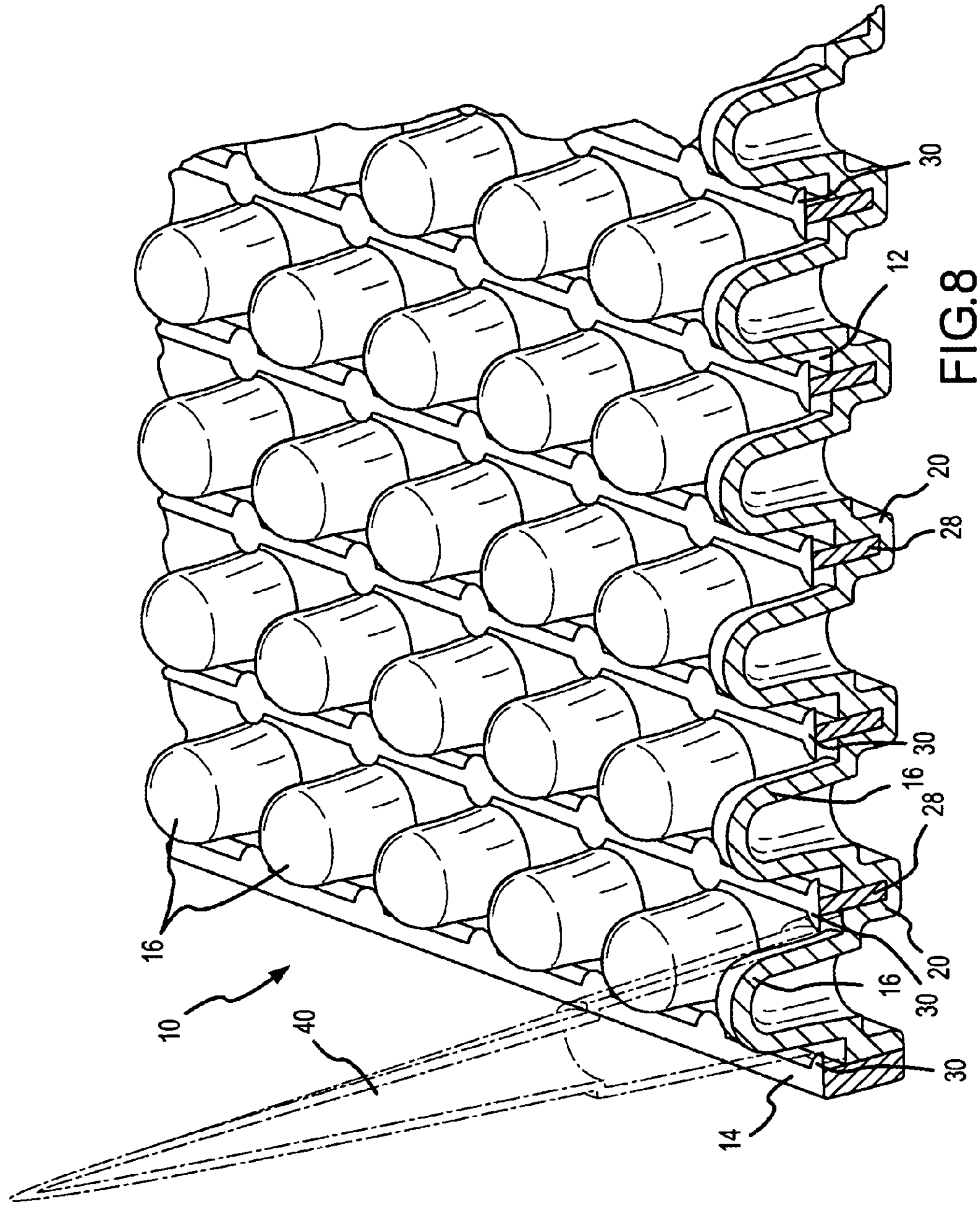
FIG. 8 is a partial cross-sectional view of the transfer plate and the frame of the pipette tip transfer apparatus of the present invention shown assembled and interlocked with one another in a retained position.

A partial cross-sectional view of transfer plate and the frame 2 and 14 of pipette tip transfer apparatus 10 of the present invention shown assembled and interlocked with one another in a retained position is shown in FIG. 8. In the retained position, small projections 30 of frame 14 contact an outer surface of pipette tip 40 which is positioned over plug member 16 of transfer plate 12 to securely hold pipette tip 40 onto plug member 16 during transfer of the pipette tips. Once the pipette tips have been transferred to a desired location, frame 14 is slid relative to transfer plate 12 so that small projections 30 of frame 14 are positioned between plug members 16 of transfer plate 12. The pipette tips then fall easily from plug members 16 into their new location.

Figure 9:
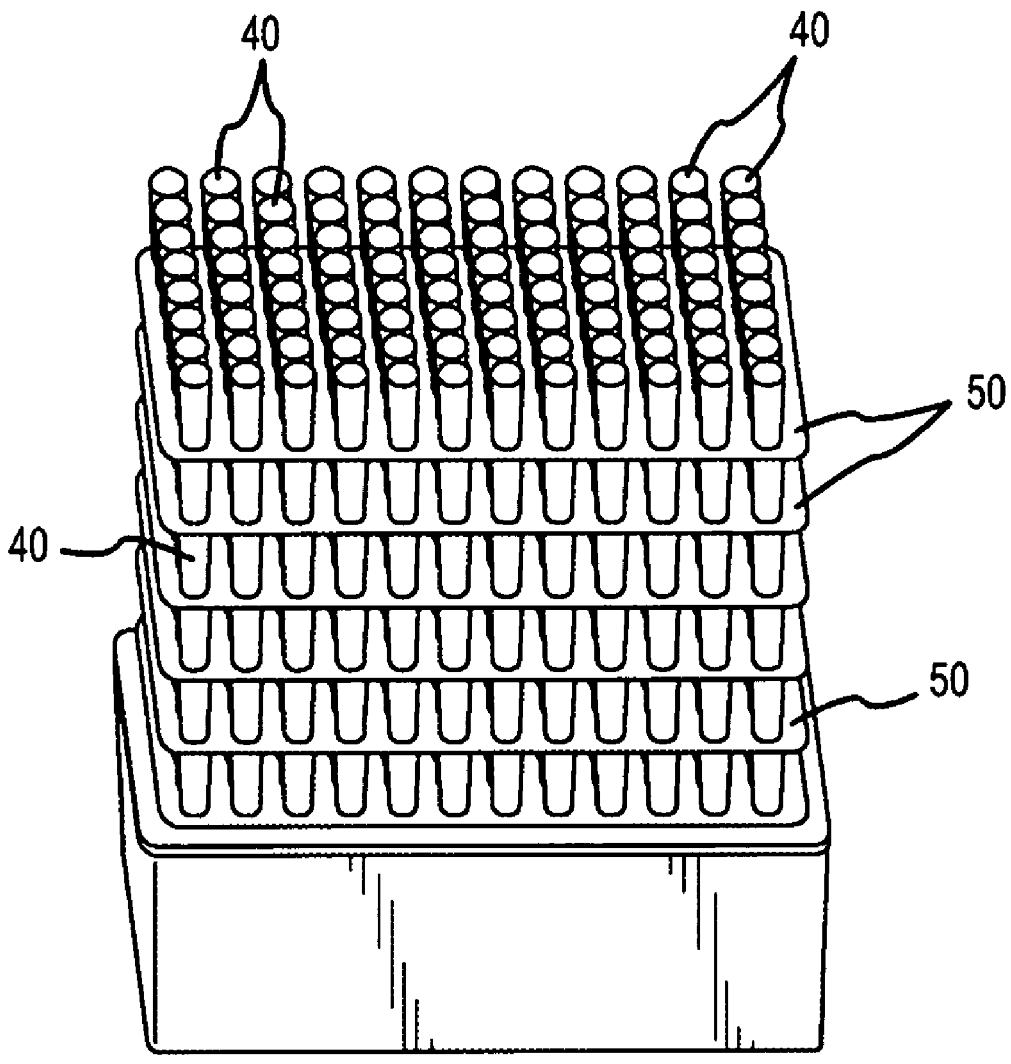
FIG. 9 is a perspective view of new pipette tips contained in typical bulk patterned storage.
Figure 10:
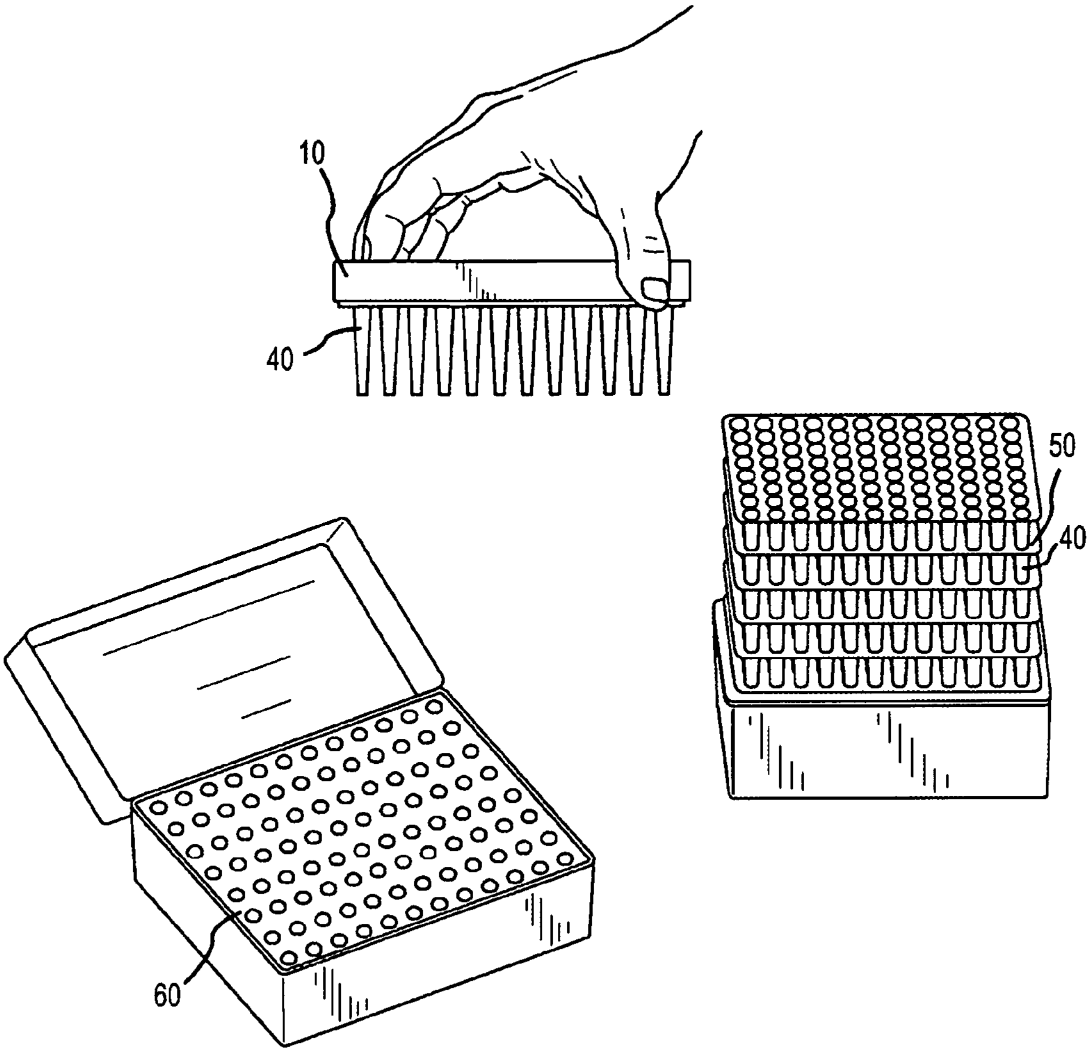
FIG. 10 is a perspective view showing the transfer of the pipette tips from bulk patterned storage to an empty pipette tip tray using the apparatus of the present invention.
Figure 11:
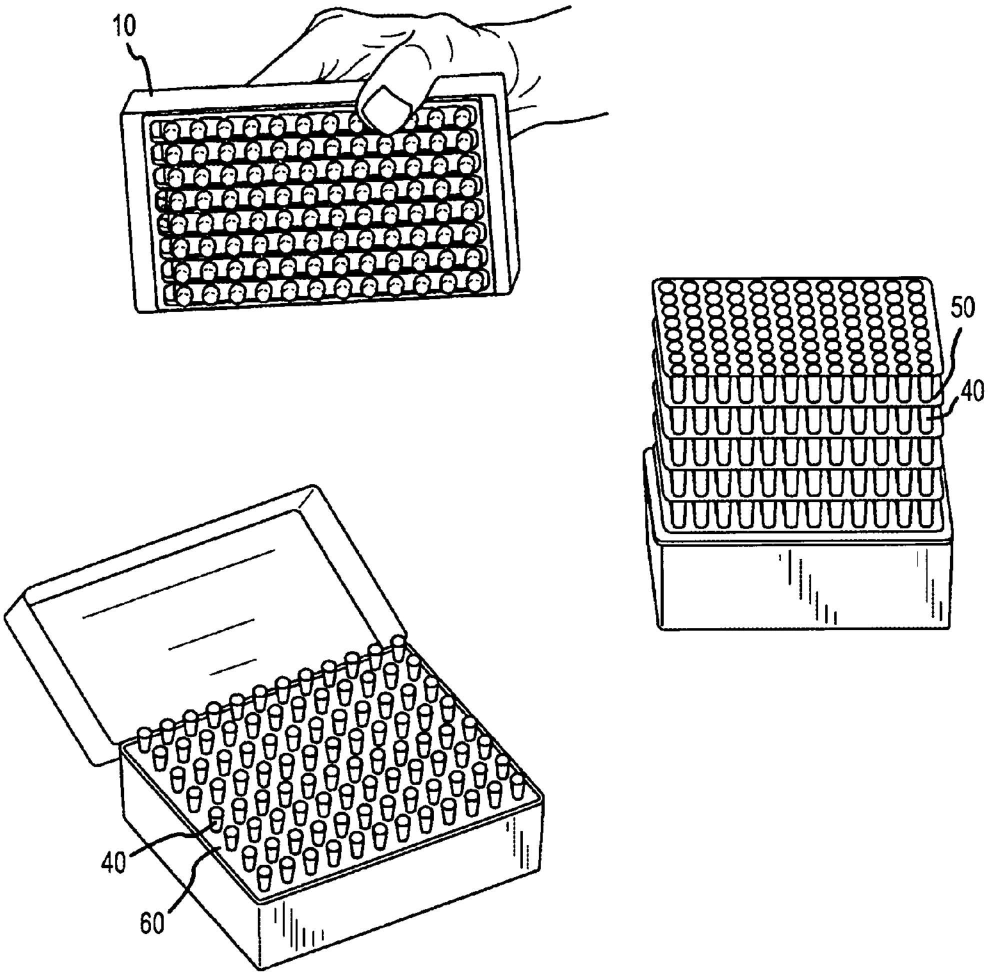
FIG. 11 is a perspective view showing the pipette tips positioned in the previously empty pipette tip tray after being released from the transfer apparatus of the present invention.

FIG. 9 shows a perspective view of new pipette tips contained in bulk patterned storage. Pipette tips are typically transferred from a box containing layers of pipette tips 40 that are separated by wafers 50 having holes for holding the pipette tips. When transferring pipette tips using the conventional method, the wafer containing the pipette tips is removed from the box and is snapped onto a tray for holding pipette tips. The present invention eliminates the need for a pipette tip holding wafer that snaps onto a tray for holding pipette tips. Instead, pipette tips can be packaged using stackers or spacers, much like the wafers shown in FIG. 9, and the pipette tip transfer apparatus of the present invention can easily remove the pipette tips from the stacker or spacer and move them to a different location by engaging the plugs of the transfer plate with the large diameter end of the pipette tips, retaining the pipette tips onto the plugs, and transferring the retained pipette tips to a different location as shown in FIG. 10. The pipette tips are then released from the plugs by sliding the frame of the apparatus 10 relative to the transfer plate of the apparatus 10 and allowing the pipette tips 40 to drop into place, in their transferred configuration, into an empty tray 60 for holding pipette tips as shown in FIG. 11.

In addition to the transfer plate and the frame which comprise the pipette tip transfer apparatus of the present invention, the present invention may also include a third, separate member which functions as a holding tray or stacking/spacer tray for retaining the pipette tips prior to engaging them with the pipette tip transfer apparatus and transferring them. This third, separate piece may also be comprised of a moldable plastic but need not be rigid or thick in composition in that its only purpose is to hold the pipette tips in position before engaging them with the pipette tip transfer apparatus.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention.

The invention claimed is:

1. An apparatus for transferring pipette tips comprising:

a transfer plate having a plurality of plug members for engaging pipette tips wherein the plurality of plug members are part of the transfer plate, and a plurality of elongated slots that separate parallel lines of the plurality of plug members; and a frame assembled and interlocked with the transfer plate, said frame having horizontal elongated slots contained therein for inserting the plug members therethrough, coplanar horizontal elongated rails separating the horizontal elongated slots, and a plurality of protuberances smaller than said plug members extending from the coplanar horizontal elongated rails into the horizontal elongated slots wherein the protuberances are part of the frame, the horizontal elongated slots in the frame are configured to fit within the elongated slots of the transfer plate.

2. The apparatus of claim 1 wherein said transfer plate and the frame are comprised of a moldable plastic.

3. The apparatus of claim 1 wherein the plug members are hollow.

4. The apparatus of claim 1 wherein sliding the transfer plate relative to the frame functions to move the apparatus in a retained and a released position when the plug members have pipette tips positioned thereon.

5. The apparatus of claim 4 wherein the protuberances contact pipette tips positioned over the plug members when the apparatus is in the retained position.

6. The apparatus of claim 4 wherein the protuberances are located between the plug members when the apparatus is in a released position.

7. The apparatus of claim 1 wherein the transfer plate further comprises at least one tab member for sliding the frame relative to the transfer plate.

8. The apparatus of claim 1 wherein the transfer plate and the frame are generally rectangular in shape.

9. The apparatus of claim 1 wherein the transfer plate and the frame are removable from one another.

* * * * *